United States Patent [19]

Kohara et al.

[11] Patent Number: 4,854,666
[45] Date of Patent: Aug. 8, 1989

[54] PHOTOSETTING RESIN COMPOSITION

[75] Inventors: Yoshiaki Kohara, Yokohama; Kazuya Shinkoda, Kanagawa, both of Japan

[73] Assignee: Mitsui Toatsu Chemicals, Incorporated, Tokyo, Japan

[21] Appl. No.: 148,985

[22] Filed: Jan. 27, 1988

[30] Foreign Application Priority Data

Feb. 4, 1987 [JP] Japan .................................. 62-22439

[51] Int. Cl.$^4$ ........................ C08F 2/50; C08F 26/02; C08F 20/18
[52] U.S. Cl. .......................... 350/96.34; 428/425.6; 522/96; 522/181; 526/301; 526/320
[58] Field of Search ................ 522/96, 181; 350/96.34

[56] References Cited

U.S. PATENT DOCUMENTS

| | | | |
|---|---|---|---|
| 3,950,238 | 4/1976 | Eldred | 522/121 |
| 4,649,062 | 3/1987 | Kosiorek | 522/96 |
| 4,694,052 | 9/1987 | Hirose et al. | 525/454 |
| 4,798,852 | 1/1989 | Zimmerman | 522/96 |

FOREIGN PATENT DOCUMENTS 2136443A 9/1984 United Kingdom .

*Primary Examiner*—John C. Bleutge
*Assistant Examiner*—Arthur H. Koeckert
*Attorney, Agent, or Firm*—Fisher, Christen & Sabol

[57] ABSTRACT

This invention provides a photosetting resin composition suitable as a coating material for optical transmission glass fibers. Owing to the inclusion of a urethane-modified (meth)acrylate and a monoacrylate represented by the following general formula [I]:

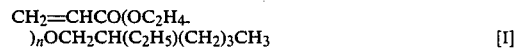

wherein n stands for an integer of 1-8, the photosetting resin composition enjoys a high photosetting speed and permits the formation of a coating film of a low modulus of elasticity. Moroever, the modulus of elasticity of the coating film has small temperature dependency at low temperatures. The present invention can hence provide light-transmitting glass fibers having excellent characteristics in optical transmission. The preferred monomer has been identified in the resin parts as 2-ethyl hexoxy ethyl acrylate, and also as 2-(2-ethylhexoxy) ethyl acrlate, and further as 2-[(2-ethylhexyl)oxy]ethyl acrylate.

10 Claims, No Drawings

PHOTOSETTING RESIN COMPOSITION

BACKGROUND OF THE INVENTION (a) Field of the Invention:

This invention relates to a photosetting resin composition. More specifically, the present invention is concerned with a photosetting resin composition suitable as a coating material for optical transmission glass fibers (will hereinafter be abbreviated as "optical fibers"). The photosetting resin composition has a high setting speed and permits the formation of a coating film of a low modulus of elasticity. Moreover, the modulus of elasticity of the coating film has small temperature dependency at low temperatures.

(b) Description of Related Art:

Optical fibers are generally applied with a primary coat of a high molecular material immediately after their drawing, so that they will be protected physically and chemically from the external environment. As such primary coating materials, silicone resins and various ultraviolet setting resins have been used primarily to date.

From the standpoint of optical transmission loss, a primary coating material for optical fibers is required to have a low modulus of elasticity and low glass transition temperature, and the temperature dependency of its modulus of elasticity is supposed to be small at low temperatures. On the other hand, a higher setting speed is desired to improve the productivity of optical fibers from the economical standpoint. Silicone resins have a low modulus of elasticity and a low glass transition temperature and hence have superb transmission characteristics. They cannot however improve the productivity due to their slow setting speed, so that they are economically inferior. Silicone resins are accompanied by another drawback that the transmission loss becomes greater along the passage of time because of substantial evolution of hydrogen gas from them.

It has also been proposed to use ultraviolet curable coating materials such as epoxy acrylates, urethane acrylates and polybutadiene acrylates. These coating materials are however accompanied by a drawback that those having a smaller modulus of elasticity generally have a slower setting speed. They are accompanied by another drawback that the temperature dependency of their moduli of elasticity at low temperatures are great, so that at low temperatures, their moduli of elasticity become greater and the transmission loss increases accordingly. Reference may be had to U.S. Pat. No. 4,694,052 in this regard.

Photosetting resin compositions composed of 20–80 wt. % of a specific urethane acrylate and 80–20 wt. % of a particular monofunctional acrylate have also been known from U.K. patent No. 2,163,443A. Their setting speeds, the temperature dependency of their moduli of elasticity and transmission losses were however not taken into consideration in the above U.K. patent.

SUMMARY OF THE INVENTION

An object of this invention is to provide a primary coating material which has a high setting speed and can form a coating film whose modulus of elasticity is small and is less temperature-dependent at low temperatures. Another object of this invention is to provide a novel optical fiber which features a smaller optical transmission loss of light.

The present invention therefore provides a photosetting resin composition comprising a urethane-modified (meth)acrylate and a monoacrylate represented by the following general formula [I]:

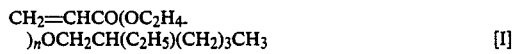

$$CH_2=CHCO(OC_2H_4)_nOCH_2CH(C_2H_5)(CH_2)_3CH_3 \quad [I]$$

wherein n stands for an integer of 1–8.

DETAILED DESCRIPTION OF THE INVENTION

As a result of various research work of the present inventors, it has been observed that a composition formed of a urethane-modified (meth)acrylate and a monoacrylate of a specific structure has a high setting speed and thus permits high-speed coating of optical fibers. It has also been found that the resulting cured material has a low modulus of elasticity and a low glass transition temperature, the temperature dependency of its modulus of elasticity is small at low temperatures and an optical fiber coated with the above composition shows excellent transmission characteristics, leading to completion of this invention.

The expression "(meth)acrylate" as used herein means both an acrylate and a methacrylate. This interpretation applies equally to other expressions such as "(meth)acryloyl group", "(meth)acrylic acid", "hydroxyethyl (meth)acrylate", "hydroxypropyl (meth)acrylate", "polyfunctional (meth)acrylate" and "monofunctional (meth)acrylate".

The urethane-modified (meth)acrylate useful in the practice of this invention is a compound which can be obtained by reacting three compounds, i.e., (a) a polyisocyanate compound, (b) a polyhydroxy compound and (c) an unsaturated monohydroxy compound having one hydroxyl group and at least one (meth)acryloyl group per molecule. The above polyisocyanate compound (a) is a substance which contains at least two isocyanate groups per molecule. As its specific examples, may be mentioned diisocyanate compounds such as 2,4-tolylene diisocyanate, 2,6-tolylene diisocyanate, diphenylmethane-4,4'-diisocyanate, xylylene diisocyanate, naphthylene diisocyanate, hexamethylene diisocyanate and isophorone diisocyanate; the dimers and trimers of these diisocyanate compounds; and compounds obtained by reacting these diisocyanate compounds with polyols such as ethylene glycol, hexanediol, trimethylolpropane, glycerin and hexanetriol under conditions of excess isocyanate groups. These polyisocyanate compounds may be used either singly or in combination.

Preferred as the aforementioned polyhydroxy compound (b) is that containing at least two hydroxyl groups per molecule and having a molecular weight of at least 700. Its illustrative examples may include polyether polyols such as polyethylene glycol, polypropylene glycol and polyoxytetramethylene glycol; and polyester polyols obtained by reacting adipic acid or dodecanedicarboxylic acid with the polyols described above, diethylene glycol, polypropylene glycol or the like; as well as polycaprolactone polyol, saturated polyolefins containing a terminal hydroxyl group, etc. If the molecular weights of these polyhydroxyl compounds are lower than 700, the moduli of elasticity will become too high. Such low molecular weights are hence not preferred.

As illustrative examples of the unsaturated monohydroxy compound (c) mentioned above, may be mentioned hydroxy (meth)acrylates such as 2-hydroxyethyl (meth)acrylamide and 2-hydroxypropyl (meth)acrylate; N-hydroxyalkyl (meth)acrylamides such as N-hydroxymethyl (meth)acrylate; (poly)alkylene glycol mono(meth)acrylates such as ethylene glycol mono(meth)acrylate, diethylene glycol mono(meth)acrylate, polyethylene glycol mono(meth)acrylate, polypropylene glycol mono(meth)acrylate; trimethylolpropane di(meth)acrylate; an equimolar reaction product of glycidyl (meth)acrylate and (meth)acrylic acid; and so on. They may be used either singly or in combination.

Regarding the proportions of the compounds (a), (b) and (c), the proportions of the compounds (a) and (c) may generally be 1.1–2.0 equivalents and 0.1–1.2 equivalents per equivalent of the compound (b), preferably, 1.2–1.8 equivalents and 0.2–1.0 equivalent per equivalent of the compounds (b), respectively.

No particular limitation is imposed on the order of reaction of the compounds (a), (b) and (c). For example, the compounds (a), (b) and (c) may be reacted at the same time, the compounds (c) may be reacted after reacting the compounds (a) and (b), or the compound (b) may be reacted subsequent to reacting the compounds (a) and (c). The reaction temperature may usually range from room temperature (20° C.) to 150° C. A conventional catalyst for urethane-modifying reactions such as triethylamine or dibutyltin dilaurate may be used to accelerate the reaction. In order to prevent the polymerization of (meth)acryloyl groups, a usual radial polymerization inhibitor such as benzoquinone, hydroquinone, hydroquinone monomethyl ether, catechol or phenothiazine may be used or air or oxygen may be introduced into the reaction system.

The terminals of the urethane-modified (meth)acrylate in this invention are usually (meth)acryloyl groups but may partly be isocyanate or hydroxyl group(s).

In the monoacrylate represented by the general formula [I] and employed in the present invention, n is an integer of 1–8. Zero (0) is not preferable for n, because a primary coating material to be formed will have a high glass transition temperature and the temperature dependency of its modulus of elasticity will be great at low temperatures. Any n values greater than 8 are not preferable either, since a composition to be formulated will have a low setting speed.

One of the terminal groups of the compound represented by the general formula [I] is limited to a 2-ethylhexyl group. If it is an alkyl group other than 2-ethylhexyl group and its carbon number is smaller than 8, the glass transition temperature will become higher and the temperature dependency of modulus of elasticity at low temperatures will become remarkable, so that the transmission loss of an optical fiber increases. Such an alkyl group is hence not preferable. If the carbon number exceeds 8, the glass transition temperature will be lowered, but the setting speed will be reduced extremely so that the high-speed drawing of an optical fiber will become no longer feasible and productivity improvements will be expected hardly. A phenyl group, alicyclic group or heterocyclic group will result in the formation of a primary coating film having a high glass transition temperature and a modulus of elasticity whose temperature dependency will be remarkable at low temperatures, thereby leading to a drawback that the transmission loss will be great. As such a monoacrylate, may be mentioned by way of example "ARONIX M-120" (trade name; product of Toagosei Chemical Industry Co., Ltd.).

In the present invention, the preferable proportion of the monoacrylate represented by the general formula [I] may generally be 80–40 parts per 20–60 parts by weight of the urethane-modified (meth)acrylate. Any urethane-modified (meth)acrylate proportion smaller than 20 parts by weight or any monoacrylate proportion greater than 80 parts by weight will result in a slower setting speed. On the other hand, any urethane-modified (meth)acrylate proportion greater than 60 parts by weight or any monoacrylate proportion smaller than 40 parts by weight will lead to an excessively high viscosity as a coating material, whereby difficulties will be encountered in coating work.

One or more of various additives such as photopolymerization initiator, polyfunctional (meth)acrylate, monofunctional (meth)acrylate, silane coupling agent, antioxidant and filler may also be incorporated in the resin composition of this invention as needed.

Although no particular limitation is imposed necessarily on the photopolymerization initiator, illustrative examples of the photopolymerization initiator may include benzoins such as benzoin, benzoin methyl ether, benzoin butyl ether and benzoin isopropyl ether; benzophenones such as benzophenone, methyl o-benzoylbenzoate and 3,3',4,4'-tetra-(t-butylperoxycarbonyl)benzophenone; acetophenones such as 2,2-diethoxyacetophenone, 2-hydroxy-2-methylpropiophenone and p-t-butyltrichloroacetophenone; benzils such as benzil and benzil dimethyl ketal; thioxanthones such as thioxanthone and chlorothioxanthone; and anthraquinones such as chloroanthraquinone, butylanthraquinone and ethylanthraquinone. An amine such as Michler's ketone [bis(4-dimethylam;inophenyl)ketone], triethylamine or an alkylmorpholine may also be used in combination with such a photopolymerization initiator. In general, such a photopolymerization initiator may be used preferably in a proportion of 1–10 wt. % of the resin composition of this invention. Although not limited particularly, as exemplary polyfunctional (meth)acrylates usable in combination in the present invention, may be mentioned ethylene glycol di(meth)acrylate, neopentyl glycol di(meth)acrylate, 1,4-butanediol di(meth)acrylate, trimethylolpropane tri(meth)acrylate, dipentole hexa(meth)acrylate, di(meth)acrylates of bisphenol A-ethylene oxide addition products, (meth)acrylic acid addition products of bisphenol A diglycidyl ether, polyester (meth)acrylates, melamine (meth)acrylates, and so on. On the other hand, illustrative examples of the monofunctional (meth)acrylate may include 2-ethylhexyl (meth)acrylate, dodecyl (meth)acrylate, phenoxyethyl (meth)acrylate, cyclohexyl (meth)acrylate, ethylene glycol nonyl phenyl ether (meth)acrylate, tripropylene glycol nonyl phenyl ether (meth)acrylate, (meth)acrylic acid addition products of butyl glycidyl ether, hydroxyethyl (meth)acrylate, hydroxypropyl (meth)acrylate, etc. They may be used in any amounts so long as effects of the present invention are not impaired.

The glass of optical fibers is a quartz glass and its principal component is silica. A preform of the quartz glass is heated to about 2,000° C. and is then drawn with an outer diameter of 125±3 μm at a takeup speed of 60–300 m/minute. Coating of the thus-drawn glass fiber with the above-mentioned coating material is performed usually by causing the fiber to pass, immediately after its drawing, through a tank containing the coating material. The thickness of the coating formulation is controlled so that after curing, the resulting coating film will generally have a thickness of 40–80 μm, preferably, about 60 μm. Regarding the curing, it is a typical method to expose a fiber to ultraviolet rays from high-pressure mercury vapor lamps in a nitrogen gas atmosphere immediately after its coating.

The present invention will hereinafter be described by the following Examples:

SYNTHESIS EXAMPLE 1

In a 500 ml flask fitted with a stirrer and thermometer, 300 parts by weight of polyoxytetramethylene glycol having a molecular weight of 1,000 and 78 parts by weight of 2,4-tolylene diisocyanate were charged and under a nitrogen gas stream, were reacted at 70° C. for 4 hours. After the reaction, NCO groups were reduced to one third of their initial concentration. The reaction mixture was then added with 38 parts by weight of hydroxyethyl acrylate, 0.2 part by weight of hydroquinone and 0.1 part by weight of dibutyltin dilaurate. The contents were reacted further at 70° C. for 5 hours while bubbling air through the reaction mixture, thereby synthesizing a urethane-modified (meth)acrylate (A-1).

SYNTHESIS EXAMPLE 2

In a 500 ml flask fitted with a stirrer and thermometer, 300 parts by weight of polyoxytetramethylene glycol having a molecular weight of 2,000 and 42 parts by weight of hexamethylene diisocyanate were charged and under a nitrogen gas stream, were reacted at 70° C. for 5 hours. After the reaction, NCO groups were reduced to two fifths of their initial concentration. The reaction mixture was then added with 27 parts by weight of hydroxypropyl acrylate, 0.2 part by weight of hydroquinone and 0.1 part by weight of dibutyltin dilaurate. The contents were reacted further at 70° C. for 5 hours while bubbling air through the reaction mixture, thereby synthesizing a urethanemodified (meth)acrylate (A-2).

SYNTHESIS EXAMPLE 3

In a 500 ml flask fitted with a stirrer and thermometer, 200 parts by weight of polycaprolactone glycol having a molecular weight of 1,000 and 70 parts by weight of 2,4-tolylene diisocyanate were charged and under a nitrogen gas stream, were reacted at 70° C. for 5 hours. After the reaction, NCO groups were reduced to one half of their initial concentration. The reaction mixture was then added with 47 parts by weight of hydroxyethyl acrylate, 0.2 part by weight of hydroquinone and 0.1 part by weight of dibutyltin dilaurate. The contents were reacted further at 70° C. for 6 hours while bubbling air through the reaction mixture, thereby synthesizing a urethane-modified (meth)acrylate (A-3).

SYNTHESIS EXAMPLE 4

In a 500 ml flask fitted with a stirrer and thermometer, 325 parts by weight of polyoxytetramethylene glycol having a molecular weight of 1,300 and 94 parts by weight of 4,4′-diphenylmethane diisocyanate were charged and under a nitrogen gas stream, were reacted at 70° C. for 4 hours. After the reaction, NCO groups were reduced to one third of their initial concentration. The reaction mixture was then added with 29 parts by weight of hydroxyethyl acrylate, 0.2 part by weight of hydroquinone and 0.1 part by weight of dibutyltin dilaurate. The contents were reacted further at 70° C. for 5 hours while bubbling air through the reaction mixture, thereby synthesizing a urethanemodified (meth)acrylate (A-4).

SYNTHESIS EXAMPLE 5

In a 500 ml flask fitted with a stirrer and thermometer, 300 parts by weight of polyoxytetramethylene glycol having a molecular weight of 2,000 and 57 parts by weight of hydrogenated 4,4′-diphenylmethane diisocyanate were charged and under a nitrogen gas stream, were reacted at 70° C. for 4 hours. After the reaction, NCO groups were reduced to one third of their initial concentration. The reaction mixture was then added with 17 parts by weight of hydroxyethyl acrylate, 0.2 part by weight of hydroquinone and 0.1 part by weight of dibutyltin dilaurate. The contents were reacted further at 70° C. for 5 hours while bubbling air through the reaction mixture, thereby synthesizing a urethane-modified (meth)acrylate (A-5).

EXAMPLE 1

A coating material was obtained by mixing 55 parts by weight of the urethane-modified (meth)acrylate (A-1) obtained in Synthesis Example 1, 45 parts by weight of a monoacrylate represented by the following structural formula:

$$CH_2=CHCOOC_2H_4OCH_2CH(C_2H_5)(CH_2)_3CH_3$$

and 3 parts by weight of benzyl dimethyl ketal as a photopolymerization initiator.

EXAMPLE 2

A coating material was obtained by mixing 40 parts by weight of the urethane-modified (meth)acrylate (A-2) obtained in Synthesis Example 2, 45 parts by weight of a monoacrylate represented by the following structural formula:

$$CH_2=CHCO(OC_2H_4)_2OCH_2CH(C_2H_5)(CH_2)_3CH_3$$

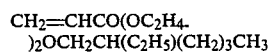

and 15 parts by weight of benzyl dimethyl ketal as a photopolymerization initiator.

EXAMPLE 3

A coating material was obtained by mixing 50 parts by weight of the urethane-modified (meth)acrylate (A-3) obtained in Synthesis Example 3, 50 parts by weight of a monoacrylate represented by the following structural formula:

$$CH_2=CHCO(OC_2H_4)_4OCH_2CH(C_2H_5)(CH_2)_3CH_3$$

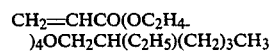

and 3 parts by weight of benzyl dimethyl ketal as a photopolymerization initiator.

EXAMPLE 4

A coating material was obtained by mixing 55 parts by weight of the urethane-modified (meth)acrylate (A-4) obtained in Synthesis Example 4, 45 parts by weight of a monoacrylate represented by the following structural formula:

$$CH_2=CHCOOC_2H_4OCH_2CH(C_2H_5)(CH_2)_3CH_3$$

and 3 parts by weight of benzyl dimethyl ketal as a photopolymerization initiator.

EXAMPLE 5

A coating material was obtained by mixing 40 parts by weight of the urethane-modified (meth)acrylate (A-5) obtained in Synthesis Example 5, 60 parts by weight of a monoacrylate represented by the following structural formula:

$$CH_2=CHCO(OC_2H_4)_4OCH_2CH(C_2H_5)(CH_2)_3CH_3$$

and 3 parts by weight of benzyl dimethyl ketal as a photopolymerization initiator.

COMPARATIVE EXAMPLE 1

A coating material was obtained by mixing 55 parts by weight of the urethane-modified (meth)acrylate (A-1) obtained in Synthesis Example 1, 45 parts by weight of 2-ethylhexyl acrylate and 3 parts by weight of benzyl dimethyl ketal as a photopolymerization initiator.

COMPARATIVE EXAMPLE 2

A coating material was obtained by mixing 55 parts by weight of the urethane-modified (meth)acrylate (A-1) obtained in Synthesis Example 1, 45 parts by weight of a monoacrylate represented by the following structural formula:

$$CH_2=CHCO(OCH_4)_{10}OCH_2CH(C_2H_5)(CH_2)_3CH_3$$

and 3 parts by weight of benzyl dimethyl ketal as a photopolymerization initiator.

COMPARATIVE EXAMPLE 3

A coating material was obtained by mixing 55 parts by weight of the urethane-modified (meth)acrylate (A-1) obtained in Synthesis Example 1, 45 parts by weight of a monoacrylate represented by the following structural formula:

$$CH_2=CHCO(OC_2H_4)_1OC_4H_9$$

and 3 parts by weight of benzyl dimethyl ketal as a photopolymerization initiator.

COMPARATIVE EXAMPLE 4

A coating material was obtained by mixing 55 parts by weight of the urethane-modified (meth)acrylate (A-1) obtained in Synthesis Example 1, 45 parts by weight of a monoacrylate represented by the following structural formula:

$$CH_2=CHCO(OC_2H_4)_{14}OC_4H_9$$

and 3 parts by weight of benzyl dimethyl ketal as a photopolymerization initiator.

COMPARATIVE EXAMPLE 5

A coating material was obtained by mixing 55 parts by weight of the urethane-modified (meth)acrylate (A-1) obtained in Synthesis Example 1, 45 parts by weight of a monoacrylate represented by the following structural formula:

$$CH_2=CHCO(OC_2H_4)_4O-C_6H_5$$

and 3 parts by weight of benzyl dimethyl ketal as a photopolymerization initiator.

COMPARATIVE EXAMPLE 6

A coating material was obtained by mixing 55 parts by weight of the urethane-modified (meth)acrylate (A-1) obtained in Synthesis Example 1, 45 parts by weight of a monoacrylate represented by the following structural formula:

$$CH_2=CHCO(OC_2H_4)_2OCH_2-\text{(furyl)}$$

and 3 parts by weight of benzyl dimethyl ketal as a photopolymerization initiator.

Evaluation of Coating Materials

The following evaluation was effected on the coating materials obtained in Examples 1–5 and Comparative Examples 1–6 respectively. Results will be summarized in Table 1.

(1) Setting speed

Each of the coating materials was applied to a thickness of about 200 μm on several glass plates. The thus-coated glass plates were exposed to ultraviolet rays at different rates in a nitrogen gas atmosphere by means of an 80 W/cm high-pressure mercury-vapor lamp, thereby preparing the corresponding number of cured films. Those films were then extracted separately with methyl ethyl ketone for 12 hours in a Soxhlet's extractor. The gel contents of the films were each determined in terms of the ratio of its weight before the extraction to that after the extraction, thereby determining the minimum exposure rate of ultraviolet rays required for making the gel content constant.

(2) Modulus of elasticity

Each of the coating materials was applied to a thickness of about 200 μm on glass plates. The thus-coated glass plates were exposed to ultraviolet rays of 80 mJ/cm$^2$ in a nitrogen gas atmosphere by means of an 80 W/cm high-pressure mercury-vapor lamp, thereby preparing cured films. The moduli in tension of those films were measured respectively at 23° C. and −40° C. in accordance with JIS K-7113.

(3) Transmission loss

An optical fiber having an outer diameter of 125 μm, which had been drawn at a speed of 60 m/min, was coated to a thickness of 60 μm with each of the coating materials right after its drawing. The thus applied coating formulation was then immediately cured by using a 32 KW high-pressure mercury-vapor lamp. The transmission losses of the thus-coated optical fiber at 23° C. and −40° C. were separately measured at a wavelength of 1.3 μm.

The setting speeds of the coating materials of Comparative Examples 2 and 4 were too low to use them actually. Their moduli of elasticity and transmission losses were hence not effected.

TABLE 1

|  |  | Example | | | | | Comparative Example | | | | | |
| --- | --- | --- | --- | --- | --- | --- | --- | --- | --- | --- | --- | --- |
|  |  | 1 | 2 | 3 | 4 | 5 | 1 | 2 | 3 | 4 | 5 | 6 |
| Setting Speed (mJ/cm$^2$) |  | 50 | 50 | 60 | 55 | 70 | 60 | 500 | 60 | 400 | 70 | 60 |
| Modulus of elasticity (kg/cm$^2$) | 23° C. | 15.0 | 13.8 | 12.5 | 14.2 | 12.0 | 18.5 | — | 20.5 | — | 21.0 | 18.0 |
|  | −40° C. | 22.5 | 16.6 | 15.0 | 21.3 | 20.0 | 55.5 | — | 60.0 | — | 65.4 | 50.0 |
| Transmission loss (dB/km) | 23° C. | 0.55 | 0.50 | 0.50 | 0.50 | 0.50 | 0.55 | — | 0.55 | — | 0.55 | 0.50 |
|  | −40° C. | 0.55 | 0.50 | 0.50 | 0.50 | 0.50 | 1.55 | — | 1.25 | — | 1.75 | 1.10 |

We claim:

1. A photosetting resin composition comprising a urethane-modified (meth)acrylate and a monoacrylate represented by the following general formula [I]:

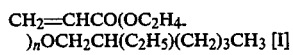

$$CH_2=CHCO(OC_2H_4)_nOCH_2CH(C_2H_5)(CH_2)_3CH_3 \quad [I]$$

wherein n stands for an integer of 1–8.

2. The composition as claimed in claim 1, comprising 20–60 parts by weight of said urethane-modified (meth)acrylate and 80–40 parts by weight of said monoacrylate represented by the general formula [I].

3. The composition as claimed in claim 1, wherein said urethane-modified (meth)acrylate has been obtained by reacting (a) a polyisocyanate compound containing at least two isocyanate groups per molecule, (b) a polyhydroxy compound containing at least two hydroxyl groups per molecule and (c) an unsaturated monohydroxy compound containing one hydroxyl group and at least one (meth)acryloyl group per molecule.

4. The composition as claimed in claim 3, wherein said polyisocyanate compound is a diisocyanate compound, the dimer or trimer of a diisocyanate compound, a reaction product of a diisocyanate and a polyol, or a reaction product of the dimer or trimer of a diisocyanate compound and a polyol.

5. The composition as claimed in claim 3, wherein said polyhydroxy compound is a polyether polyol, a polyester polyol, a polycaprolactone polyol or a saturated polyolefin containing a terminal hydroxyl group, and has a molecular weight of at least 700.

6. The composition as claimed in claim 3, wherein said unsaturated monohydroxy compound is selected from hydroxyalkyl (meth)acrylates, N-hydroxyalkyl (meth)acrylamides, (poly)alkyleneglycol mono(meth)acrylates, trimethylolpropane di(meth)acrylates, and equimolar reaction products of glycidyl (meth)acrylates and (meth)acrylic acid.

7. The composition as claimed in claim 3, wherein the ratio of said polyisocyanate compound (a), polyhydroxy compound (b) and unsaturated monohydroxy compound (c) is 1.1–2.0 : 1 : 0.1–1.2 in terms of equivalent.

8. The composition as claimed in claim 3, wherein said reaction has been conducted at 20–150° C. in the presence of a catalyst for urethane-modifying reaction and a radical polymerization inhibitor.

9. The composition as claimed in claim 1, further comprising 1–10 wt. % of a photopolymerization initiator.

10. An optical transmission glass fiber coated with the photosetting resin composition as claimed in claim 1.

* * * * *